(12) United States Patent
Zou

(10) Patent No.: US 10,141,995 B2
(45) Date of Patent: Nov. 27, 2018

(54) METHOD FOR SELECTING ANTENNA AND ELECTRONIC DEVICE

(71) Applicant: SHENZHEN ROYOLE TECHNOLOGIES CO. LTD., Shenzhen, Guangdong (CN)

(72) Inventor: Xiang Zou, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/758,397

(22) PCT Filed: Dec. 31, 2015

(86) PCT No.: PCT/CN2015/100287
§ 371 (c)(1),
(2) Date: Mar. 8, 2018

(87) PCT Pub. No.: WO2017/113371
PCT Pub. Date: Jul. 6, 2017

(65) Prior Publication Data
US 2018/0262248 A1    Sep. 13, 2018

(51) Int. Cl.
*H04B 7/06* (2006.01)
*H04B 7/04* (2017.01)
(Continued)

(52) U.S. Cl.
CPC ............ *H04B 7/0608* (2013.01); *H04B 7/04* (2013.01); *H04B 7/0404* (2013.01); *H04W 64/00* (2013.01)

(58) Field of Classification Search
USPC ............... 375/347, 448, 259; 455/574, 277.1
See application file for complete search history.

(56) References Cited

U.S. PATENT DOCUMENTS 5,548,836 A * 8/1996 Taromaru ............ H04B 7/0814
455/272
6,047,019 A * 4/2000 Ishii ..................... H04B 7/0814
343/703
(Continued)

FOREIGN PATENT DOCUMENTS

CN    200941615    8/2007
CN    103797726    5/2014
(Continued)

OTHER PUBLICATIONS

International search report dated Oct. 10, 2016 from corresponding application No. PCT/CN2015/100287.

*Primary Examiner* — Eva Puente
(74) *Attorney, Agent, or Firm* — Hauptman Ham, LLP

(57) ABSTRACT

A method for selecting an antenna is provided. S1, whether a signal intensity of a default working antenna among multiple antennae of an electronic device is lower than a preset value is detected, when not, repeat S1, otherwise, proceed to S2. S2, whether a current operating environment of the electronic device is matched with a preset operating environment is detected, when yes, proceed to S3, otherwise, proceed to S5. S3, a first antenna of the multiple antennas is enabled as a working antenna, and the first antenna is located on the electronic device at a position that is least affected by the current operating environment. S4, whether a signal intensity of the first antenna is lower than the preset value is detected, when not, repeat S4, otherwise, proceed to S5. S5, an antenna with the highest signal intensity among the multiple antennas is enabled as the working antenna.

12 Claims, 3 Drawing Sheets

(51) Int. Cl.
    *H04B 7/0404*    (2017.01)
    *H04W 64/00*    (2009.01)

(56) References Cited

U.S. PATENT DOCUMENTS

| | | | | |
|---|---|---|---|---|
| 6,571,090 | B1 * | 5/2003 | Moriyama | H04B 7/0822 |
| | | | | 375/347 |
| 7,830,997 | B2 * | 11/2010 | Kawada | H04B 7/082 |
| | | | | 375/347 |
| 2005/0070341 | A1 * | 3/2005 | Umewaka | H04B 7/0814 |
| | | | | 455/574 |
| 2010/0158138 | A1 * | 6/2010 | Ryu | H04B 7/18513 |
| | | | | 375/259 |

FOREIGN PATENT DOCUMENTS

| | | |
|---|---|---|
| CN | 104717303 | 6/2015 |
| WO | 2015012657 | 1/2015 |

\* cited by examiner

METHOD FOR SELECTING ANTENNA AND ELECTRONIC DEVICE

RELATED APPLICATIONS

The present application is a National Phase of International Application Number PCT/CN2015/100287, filed Dec. 31, 2015.

TECHNICAL FIELD

The present disclosure relates to the field of communication, and more particularly to a method for selecting an antenna and an electronic device.

BACKGROUND

With the rapid development of communication technologies and the demand of people for immediate communication, electronic devices having wireless communication functions are widely used. These electronic devices generally have an antenna to communicate with a base station.

However, these electronic devices are often affected by product size restrictions, an operating environment and usage state, leaving the antenna performance not optimized. Take an electronic device as an example of a mobile communication terminal for illustration, when a user holds a mobile communication terminal to make a call or puts it in a carry-on pocket to talk through a headset, keys and metal objects located in the holding area, the human head or other parts of the body, will have a negative impact on the antenna performance of the mobile communication terminal.

Currently, in order to solve the above problem, the electronic device mentioned above is provided with two antenna units. These two antenna units are disposed at different positions of the electronic device. According to the standing gesture of the electronic device, the electronic device can select one of the two antenna units to communicate with an outside base station.

Although the above solution can optimize the antenna unit performance of the electronic device to some extent, since the electronic device selects one antenna unit according to the standing gesture, in fact, the antenna unit may be affected by other factors besides the standing gesture. Therefore, the antenna performance of the electronic device cannot be further optimized, and the above solution still has some limitations.

SUMMARY

The present disclosure aims to solve at least one of the technical problems existing in the related art. To this end, the present disclosure needs to provide a method for selecting an antenna and an electronic device.

A method for selecting an antenna is provided. The method is applicable to an electronic device including multiple antennas and includes the following steps.

At step S1, detect whether a signal intensity of a default working antenna among the multiple antennas is lower than a preset value; if not, repeat step S1, and if yes, proceed to step S2.

At step S2, detect whether a current operating environment of the electronic device is matched with a preset operating environment; if yes, proceed to step S3, and if not, proceed to step S5.

At step S3, enable a first antenna of the multiple antennas as a working antenna, and the first antenna is located on the electronic device at a position that is least affected by the current operating environment.

At step S4, detect whether a signal intensity of the first antenna is lower than the preset value; if not, repeat step S4, and if yes, proceed to step S5.

At step S5, enable an antenna with the highest signal intensity among the multiple antennas as the working antenna.

An electronic device is provided. The electronic device includes a controller, an operating environmental sensor, an antenna selection switch, and multiple antennas. The multiple antennas are connected to the antenna selection switch. The controller is connected to the operating environmental sensor and the antenna selection switch.

The controller is configured to detect whether a signal intensity of a default working antenna among the multiple antennas is lower than a preset value.

When the signal intensity of the default working antenna is lower than the preset value, the controller is configured to detect whether a current operating environment of the electronic device is matched with a preset operating environment.

When the current operating environment of the electronic device is matched with the preset operating environment, the controller is configured to control the antenna selection switch to enable a first antenna of the multiple antennas as a working antenna, and the first antenna is located on the electronic device at a position that is least affected by the current operating environment.

The controller is configured to detect whether a signal intensity of the first antenna is lower than the preset value. When the signal intensity of the first antenna is not lower than the preset value, the controller is configured to re-detect whether the signal intensity of the first antenna is lower than the preset value; when the signal intensity of the first antenna is lower than the preset value, the controller is configured to control the antenna selection switch to enable an antenna with the highest signal intensity among the multiple antennas as the working antenna.

When the current operating environment of the electronic device is not matched with the preset operating environment, the controller is configured to control the antenna selection switch to enable an antenna with the highest signal intensity among the multiple antennas as the working antenna.

The method for selecting an antenna and the electronic device mentioned above can analyze the most suitable antenna in real time according to changes of the operating environment of the electronic device and signal intensities of the antennas and switch to the antenna automatically, so as to ensure that the antenna of the electronic device can be always in the best work status.

Additional aspects and advantages of the disclosure will be set forth in part in the following description, and in part will be apparent from the description or from the practice of the disclosure.

BRIEF DESCRIPTION OF THE DRAWINGS

The foregoing and/or additional aspects and advantages of the present disclosure will be readily apparent from the following description of the embodiments taken in conjunction with the accompanying drawings.

DETAILED DESCRIPTION OF ILLUSTRATED EMBODIMENTS

Figure 1:
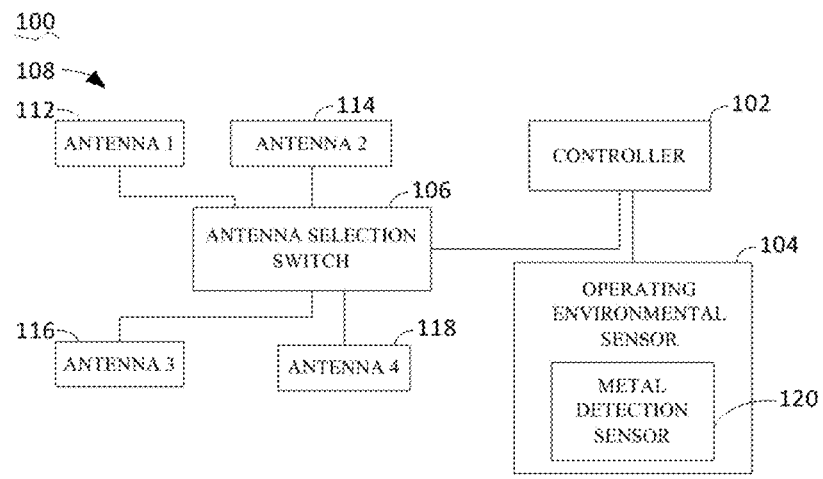
FIG. 1 is a block diagram of an electronic device according to an embodiment.

Embodiments of the present disclosure are described in detail below, and examples of the embodiments are illustrated in the accompanying drawings, where same or similar reference numerals denote same or similar elements or elements having the same or similar functions throughout the specification. The embodiments described below with reference to the accompanying drawings are exemplary and are merely used to explain the present disclosure, and should not be construed as limiting the present disclosure.

It is to be understood that in the description of the present disclosure, the terms "first" and "second" are for descriptive purposes only, and should not be understood as indicating or implying relative importance or implied indication of the number of technical features indicated. Thus, features defined by "first" and "second" may explicitly or implicitly include one or more of the features. In the description of the present disclosure, unless expressly limited otherwise, "multiple" means two or more.

It should also be noted that in the description of the present disclosure, unless the context clearly indicates otherwise, the terms "mounted," "coupled," and "connected" should be explained broadly. For example, the terms may refer to a fixed connection, a removable connection, or an integrated connection; or, may refer to a mechanical connection, an electrical connection, or mutual communication; or, may refer to a direct connection, an indirect connection via an intermediary, or an internal communication or interaction of two elements. For those skilled in the art, the meanings of the above terms referred to in the present disclosure may be understood based on specific situations.

The following disclosure provides different embodiments or examples for implementing different structures of the present disclosure. In order to simplify the description, specific examples of the components and settings will be described below. The examples are not intended to limit the present disclosure. In addition, for the sake of brevity and clarity, different reference numerals and/or reference letters may be repeated in different instances; however, this does not indicate the relationship between various embodiments and/or arrangements discussed. In addition, the present disclosure provides examples of various specific processes and materials; however, one of ordinary skill in the art may recognize other applications of other processes and/or materials.

Referring to FIG. 1, an electronic device 100 according to a first embodiment of the present disclosure is provided. The electronic device 100 includes a controller 102, an operating environmental sensor 104, an antenna selection switch 106, and multiple antennas 108. The multiple antennas 108 are connected to the antenna selection switch 106. The controller 102 is connected to the operating environmental sensor 104 and the antenna selection switch 106.

Figure 2:
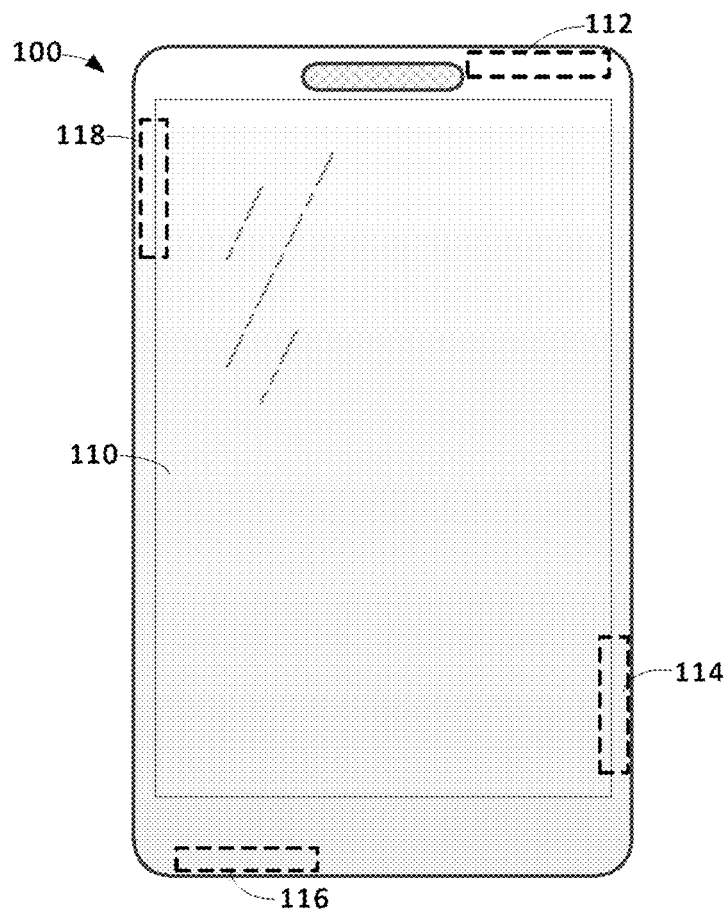
FIG. 2 is a schematic plan view of an electronic device according to an embodiment.

Referring to FIG. 2, the electronic device 100 can be an electronic device equipped with a mobile communication function. The electronic device 100 can be a mobile phone, a tablet computer, a wearable electronic device, or the like. Alternatively, the electronic device 200 can be a small computing terminal which can provide audio and video signals to a video display terminal and has local communication function, such as a TV box with WiFi function or other electronic devices. The electronic device 100 can communicate with a signal transmitting base station or a router (not shown). Therefore, in this implementation, the mobile communication antenna is described as an example of the antenna; however, the implementation of the present disclosure is not limited thereto. The electronic device 100 may conduct signal transmission with the signal transmitting base station through one of the multiple antennas 108. In addition, in this implementation, as an example, four antennas 108 are used.

The electronic device 100 substantially has a rectangular parallelepiped shape. The electronic device 100 has a display screen 110. At first, the electronic device 100 may set one of the four antennas as a default working antenna 112 and set the other three antennas as alternative antennas (hereinafter, a first alternative antenna 114, a second alternative antenna 116, and a third alternative antenna 118).

In one embodiment, the default working antenna 112 is disposed at an inner position of a front upper right corner of the electronic device 100 (the front of the electronic device 100 is a side that often faces a user during usage of the electronic device 100, for example, one side of the electronic device 100 that having a display screen 110). When the user using the electronic device 100 to make a call, the position of the default working antenna 112 mentioned above is conducive to the antenna to receive and send signals.

The first alternative antenna 114 is disposed at an inner position of a front lower right corner of the electronic device 100, the second alternative antenna 116 is disposed at a front lower left corner of the electronic device 100, and the third alternative antenna 118 is disposed at a front upper left corner of the electronic device 100, in this way, the four antennas can be separated as much as possible, such that the electronic device 100 can receive and send signals through one of the antennas in different directions.

The controller 102 is configured to detect whether signal intensity of the default working antenna 112 is lower than a preset value. The electronic device 100 may work in a variety of different operating environments, which may adversely affect the antenna performance of the electronic device 100. Therefore, the controller 102 is configured to determine whether the performance of the default working antenna 112 meets requirements by comparing the signal intensity of the default working antenna 112 with the preset value.

The preset value may be set according to a frequently used operating environment of the electronic device 100. For example, when the electronic device 100 is a portable electronic device such as a mobile phone, the operating environment is usually an outdoor environment and the preset value may be set to be a larger value; when the electronic device 100 is one that is relatively inconvenient to carry, such as a tablet computer, the operating environment of the electronic device 100 is usually an indoor environment, and the preset value can be set to be a smaller value. The setting of the preset value is limited to the above two exemplary cases.

When the signal intensity of the default working antenna 112 is lower than the preset value, the controller 102 is configured to detect whether a current operating environment of the electronic device 100 is matched with a preset operating environment. When the signal intensity of the default working antenna 112 is not lower than the preset value, the controller 102 is configured to re-detect whether the signal intensity of the default working antenna 112 is lower than the preset value.

When the current operating environment of the electronic device 100 is matched with the preset operating environment, the controller 102 is configured to control the antenna selection switch 106 to enable a first antenna of the multiple antennas as a working antenna, and the first antenna is located on the electronic device at a position that is least affected by the current operating environment.

Specifically, in one embodiment, the preset operating environment includes an operating environment where the electronic device 100 is in the vicinity of an external metal. Correspondingly, the operating environmental sensor 104 includes a metal detection sensor 120 for detecting a metal direction of the external metal. The preset operating environment simulates a situation that the electronic device 100 is placed in an environment surrounding metal components in routine use of the electronic device 100, for example, the electronic device 100 is placed in a pocket with keys therein.

The controller 102 is configured to enable the metal detection sensor 120 to detect a metal direction and further determine whether the metal detection sensor 120 has detected the metal direction of the external metal. Metal contained in the electronic device 100 may interfere with the metal detection sensor 120. Therefore, the electronic device 100 may be placed in an environment without external metal to zero the metal detection sensor 120. In this way, the metal detection sensor 120 can detect the metal direction of the external metal when the electronic device 100 is placed in the operating environment near the external metal.

When the controller 102 determines that the metal detection sensor 120 has detected the metal direction of the external metal, it indicates that the electronic device 100 is in an operating environment near the external metal. According to the metal direction, the controller 102 can control the antenna selection switch 106 to enable the first antenna, which is farthest from the external metal among the multiple antennas, as the working antenna. For example, referring to FIG. 2, when the metal direction of the external metal is above the front of the electronic device 100, the controller 102 is configured to control the antenna selection switch 106 to enable the second alternative antenna 116 disposed at the front lower left corner of the electronic device 100 as the working antenna. In this way, the influence of the external metal on the working antenna of the electronic device 100 can be minimized.

The controller 102 is configured to detect whether a signal intensity of the first antenna is lower than the preset value. When the signal intensity of the first antenna is not lower than the preset value, the controller 102 is configured to re-detect whether the signal intensity of the first antenna is lower than the preset value. When the signal intensity of the first antenna is lower than the preset value, the controller 102 is configured to control the antenna selection switch 106 to enable an antenna with the highest signal intensity among the multiple antennas as the working antenna.

In particular, in addition to the influence of the external metal, signal intensities of the antennas may be affected by other factors. Therefore, in the case of enabling the first antenna (for example, the second alternative antenna 116 in the embodiment) furthest from the external metal, signal intensity of the second alternative antenna 116 may not be as expected. The controller 102 is configured to detect the signal intensity of the second alternative antenna 116 in real time and determine whether the signal intensity of the second alternative antenna 116 reaches the expected level.

When the signal intensity of the first antenna does not reach the expected level, the controller 102 is configured to control the antenna selection switch 106 to enable an antenna having the highest signal intensity among the multiple antennas as the working antenna. In this way, the antenna performance of the electronic device 100 is optimized.

When the current operating environment of the electronic device 100 is not matched with the preset operating environment, the controller 102 is configured to enable an antenna with the highest signal intensity among the multiple antennas as the working antenna. For example, when the controller 102 determines that the metal detection sensor 120 has not detected the metal direction of the external metal, it indicates that the current operating environment of the electronic device 100 is not affected by the external metal. Therefore, when the signal intensity of the default working antenna 112 is lower than the preset value and the current operating environment of the electronic device 100 is not affected by the external metal, the controller 102 of the electronic device 100 is configured to enable the antenna with the highest signal intensity as the working antenna, so that the antenna performance of the electronic device 100 can be optimized.

Additionally, the controller 102 is further configured to analyze all antennas with signal intensity greater than the preset value, to obtain a second antenna with a minimum change in signal intensity within a preset time. The controller 102 is further configured to control the antenna selection switch 106 to enable the second antenna as the working antenna.

Specifically, after the first antenna or an antenna with the highest signal is enabled, a current operating environment of the electronic device 100 may be changed, and signal intensities of the multiple antennas may be changed accordingly. Therefore, after a period of time, the controller 102 is configured to enable, among all antennas with signal intensity greater than the preset value, the second antenna that has the smallest change in signal intensity within the preset time as the working antenna. In this way, the electronic device 100 can operate in the most stable state of the antenna. It should be understood that, in some cases, the first antenna and the second antenna may refer to the same antenna, or may refer to different antennas. For example, when the second alternative antenna 116 is enabled as the first antenna, and in a later time period, the second alternative antenna 116 is one with the smallest change in signal intensity within the preset time, among all antennas with signal intensity greater than the preset value, then the second alternative antennal 116 is the second antenna. For another example, in a later time period, the third alternative antenna 118 is one with the smallest change in signal intensity within the preset time, among all antennas with signal intensity greater than the preset value, and then the third alternative antenna 118 is the second antenna.

In summary, according to changes of the operating environment of the electronic device 100 and signal intensities of the antennas, the electronic device 100 can analyze the most suitable antenna in real time and automatically switches to the antenna, and it is possible to ensure that the antenna of the electronic device 100 is in good working condition.

Figure 3:
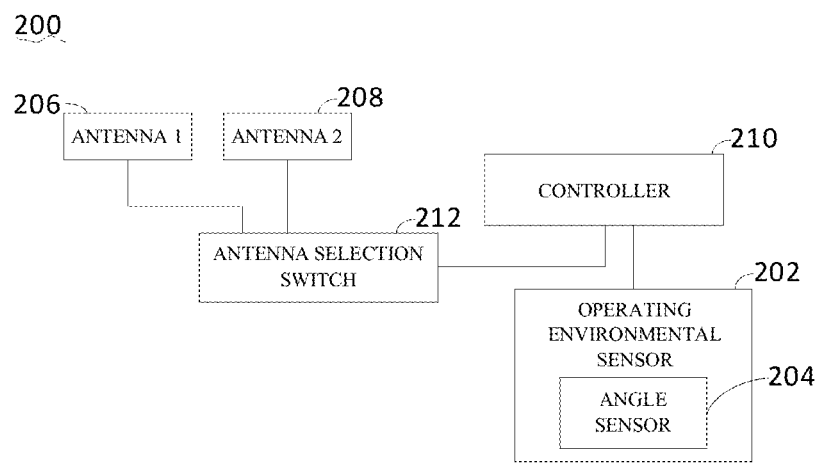
FIG. 3 is a block diagram of another electronic device according to an embodiment.

Referring to FIG. 3, an electronic device 200 is provided according to a second embodiment of the present disclosure. The electronic device 200 of the embodiment is basically the same as the electronic device 100 of the first embodiment except that an operating environmental sensor 202 of the present embodiment includes an angle sensor 204 instead of the metal detection sensor 120.

Figure 4:
FIG. 4 is a schematic side view of an electronic device according to an embodiment.

Specifically, referring to FIG. 4, as an example, the electronic device 200 has two antennas, one antenna 206 is disposed at an inner position above the front of the electronic device 200 and the other antenna 208 is disposed at an inner position below the back of the electronic device 200. Initially, the antenna 206 disposed at an inner position above the front of the electronic device 200 is an default working antenna 206, and the antenna 208 disposed at an inner position below the back of the electronic device 200 is an alternative antenna 208.

The preset operating environment includes an operating environment where the electronic device 200 is in a flipped state. Correspondingly, the angle sensor 204 is configured to detect a placement angle of the electronic device 200, for example, whether the electronic device 200 is placed face-up or flipped over on a support surface 300 such as a desktop. The preset operating environment simulates an environment where the electronic device 200 is flipped and placed on the support surface 300 such as a desktop in routine usage, as illustrated in FIG. 4.

The controller 210 is configured to enable the angle sensor 204 to detect a placement angle of the electronic device 200 and determine whether the electronic device 200 is flipped according to the placement angle detected. When flipping is detected, the controller 210 is configured to control an antenna selection switch 212 to enable the first antenna as the working antenna, and the first antenna is the alternative antenna 208 located below the back of the electronic device 200.

When no flipping is detected, the controller 210 is configured to enable an antenna with the highest signal intensity among the two antennas as the working antenna. In one embodiment, reference can be made to the description of the first embodiment for other details, and it will not be repeated herein.

To sum up, according to changes of the operating environment of the electronic device 200 and signal intensities of the antennas, the electronic device 200 can analyze the most suitable antenna from time to time and automatically switches to the antenna, and it is possible to ensure that the antenna of the electronic device 200 is in a good working condition.

It can be understood that, the number and installation positions of antennas mentioned in the above embodiments are for illustrating purpose only and the present disclosure is not limited thereto. The number and installation positions of the antennas can be changed correspondingly according to the actual operating environment of the electronic device.

Figure 5:
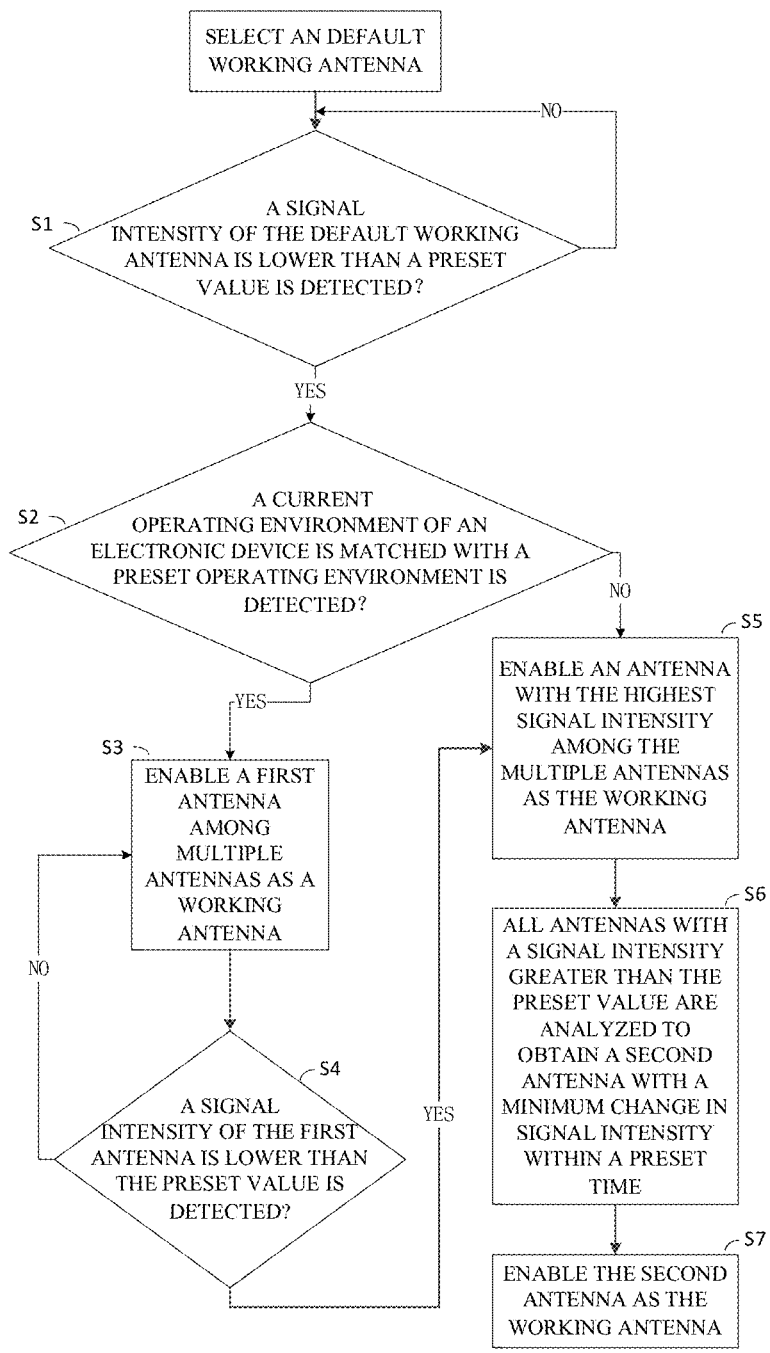
FIG. 5 is a flow chart illustrating a method for selecting an antenna being applicable to an electronic device according to an embodiment.

Referring to FIG. 5, according to a third embodiment of the present disclosure, a method for selecting an antenna for an electronic device including multiple antennas is provided. The method includes the following steps.

At step S1, whether a signal intensity of a default working antenna among the multiple antennas is lower than a preset value is detected; if not, repeat step S1, otherwise, proceed to step S2.

At step S2, whether a current operating environment of the electronic device is matched with a preset operating environment is detected; if yes, proceed to step S3, otherwise, proceed to step S5.

At step S3, a first antenna of the multiple antennas is enabled as a working antenna, and the first antenna is located on the electronic device at a position that is least affected by the current operating environment.

At step S4, whether a signal intensity of the first antenna is lower than the preset value is detected; if not, repeat step S4, otherwise, proceed to step S5.

At step S5, enable an antenna with the highest signal intensity among the multiple antennas as the working antenna.

It can be understood that the method for selecting the antenna can be implemented by the electronic device according to any of the above embodiments.

At step S1, the controller detects whether the signal intensity of the default working antenna among the multiple antennas is lower than the preset value.

At step S2, the controller detects, through the operating environmental sensor, whether the current operating environment of the electronic device is matched with the preset operating environment.

In one embodiment, the preset operating environment includes an operating environment where the electronic device is in the vicinity of an external metal, and step S2 includes: whether the current operating environment is an operating environment where the electronic device is in the vicinity of the external metal is determined by detecting a metal direction of the external metal via a metal detection sensor, if yes, proceed to step S3, otherwise, proceed to step S5.

At step S3, the controller controls the antenna selection switch to enable the first antenna of the multiple antennas as the working antenna, and the first antenna is an antenna furthest from the external metal among the multiple antennas. In this way, the antenna performance of the electronic device can be optimized.

In one embodiment, the preset operating environment includes an operating environment where the electronic device is in a flipped state, and step S2 includes: whether the current operating environment is an operating environment where the electronic device is in a flipped state is determined by detecting flipping of the electronic device via a metal detection sensor, if yes, proceed to step S3, otherwise, proceed to step S5.

At step S3, the first antenna is an antenna located on the back of the electronic device among the multiple antennas. Therefore, the antenna performance of the electronic device can be optimized.

At step S4, the controller detects whether the signal intensity of the first antenna is lower than the preset value.

At step S5, the controller controls the antenna selection switch to enable an antenna having the highest signal intensity among the multiple antennas as the working antenna.

In one embodiment, after step S5, the method for selecting an antenna further includes the following steps. At step S6, all antennas with a signal intensity greater than the preset value is analyzed to obtain a second antenna with a minimum change in signal intensity within a preset time. At step S7, enable the second antenna as the working antenna. Therefore, the electronic device can be operated in the most stable state of the antenna.

At step S6, the controller analyzes all antennas with signal strength greater than the preset value. At step S7, the controller controls the antenna selection switch to enable the second antenna as the working antenna.

To sum up, according to changes of the operating environment of the electronic device and signal intensities of the antennas, the above antenna selection method can analyze the most suitable antenna in a real time and automatically switches to the antenna, thereby, it is possible to ensure that the antenna of the electronic device is always in the best working condition.

In the description of the disclosure, the terms "one embodiment," "some embodiments," "exemplary embodiments," "examples," "specific examples," or "some examples" or the like means that specific features, structures, materials, or characteristics described in combination with embodiments or examples can be included in at least one embodiment or example of the present disclosure. In the specification, the schematic expression of the above terms does not necessarily refer to the same embodiment or example. Furthermore, the particular features, structures, materials, or characteristics described may be combined in any suitable manner in any one or more embodiments or examples.

Although the present disclosure is illustrated in detail by referring to the preceding embodiments, it should be understood by one of skill in the art that various changes, modifications, substitutions and variations may be made to these embodiments without departing from the spirit and scope of the present disclosure, the scope of the present disclosure is defined by the claims and their equivalents.

What is claimed is:

1. A method for selecting an antenna, being applicable to an electronic device comprising multiple antennas, the method comprising:
    S1, detecting whether a signal intensity of a default working antenna among the multiple antennas is lower than a preset value, repeating step S1 when the signal intensity of the default working antenna is not lower than a preset value, and proceeding to step S2 when the signal intensity of the default working antenna is lower than a preset value;
    S2, detecting whether a current operating environment of the electronic device is matched with a preset operating environment, proceeding to step S3 when the current operating environment is matched with the preset operating environment, proceeding to step S5 when the current operating environment is not matched with the preset operating environment;
    S3, enabling a first antenna of the multiple antennas as a working antenna, the first antenna being located on the electronic device at a position that is least affected by the current operating environment;
    S4, detecting whether a signal intensity of the first antenna is lower than the preset value, repeating step S4 when the signal intensity of the first antenna is not lower than the preset value, and proceeding to step S5 when the signal intensity of the first antenna is lower than the preset value; and
    S5, enabling an antenna with the highest signal intensity among the multiple antennas as the working antenna.

2. The method of claim 1, wherein the preset operating environment comprises an operating environment where the electronic device is in the vicinity of an external metal, and step S2 comprises:
    determining whether the current operating environment is the operating environment where the electronic device is in the vicinity of the external metal by detecting a metal direction of the external metal via a metal detection sensor, proceeding to step S3 when the current operating environment is the operating environment where the electronic device is in the vicinity of the external metal, and proceeding to step S5 when the current operating environment is not the operating environment where the electronic device is in the vicinity of the external metal.

3. The method of claim 2, wherein the first antenna is an antenna farthest from the external metal among the multiple antennas.

4. The method of claim 1, wherein the preset operating environment comprises an operating environment where the electronic device is in a flipped state and step S2 comprises:
    determining whether the current operating environment is the operating environment where the electronic device is in the flipped state by detecting flipping of the electronic device via a metal detection sensor, proceeding to step S3 when the current operating environment is the operating environment where the electronic device is in the flipped state, and proceeding to step S5 when the current operating environment is not the operating environment where the electronic device is in the flipped state.

5. The method of claim 4, wherein the first antenna is an antenna located on the back of the electronic device among the multiple antennas.

6. The method of claim 1, comprising the following after step S5:
    S6, analyzing all antennas with a signal intensity greater than the preset value to obtain a second antenna with the smallest change in signal intensity within a preset time; and
    S7, enabling the second antenna as the working antenna.

7. An electronic device, comprising:
    a controller, an operating environmental sensor, an antenna selection switch, and multiple antennas;
    the multiple antennas being connected to the antenna selection switch;
    the controller being connected to the operating environmental sensor and the antenna selection switch;
    the controller being configured to detect whether a signal intensity of a default working antenna among the multiple antennas is lower than a preset value;
    the controller being configured to detect whether a current operating environment of the electronic device is matched with a preset operating environment, when the signal intensity of the default working antenna is lower than the preset value;
    the controller being configured to control the antenna selection switch to enable a first antenna among the multiple antennas as a working antenna when the current operating environment of the electronic device is matched with the preset operating environment, and the first antenna being located on the electronic device at a position that is least affected by the current operating environment;
    the controller being configured to detect whether a signal intensity of the first antenna is lower than the preset value, the controller being configured to re-detect whether the signal intensity of the first antenna is lower than the preset value whenthe signal intensity of the first antenna is not lower than the preset value, and the controller being configured to control the antenna selection switch to enable an antenna with the highest signal intensity among the multiple antennas as the working antenna when the signal intensity of the first antenna is lower than the preset value; and
    the controller being configured to control the antenna selection switch to enable an antenna with the highest signal intensity among the multiple antennas as the working antenna, when the current operating environment of the electronic device is not matched with the preset operating environment.

8. The electronic device of claim 7, wherein the preset operating environment comprises an operating environment where the electronic device is in the vicinity of an external metal;

wherein the operating environmental sensor comprises a metal detection sensor, and the metal detection sensor being configured to detect a metal direction of the external metal, the controller being configured to determine whether the metal detector has detected the metal direction of the external metal; the controller being configured to control the antenna selection switch to enable the first antenna as the working antenna, based on a determination that the metal detector has detected the metal direction of the external metal, and the controller being configured to control the antenna selection switch to enable an antenna with the highest signal intensity among the multiple antennas as the working antenna, based on a determination that the metal detector has not detected the metal direction of the external metal.

9. The electronic device of claim 8, wherein the first antenna is an antenna farthest from the external metal among the multiple antennas.

10. The electronic device of claim 7, wherein the preset operating environment comprises an operating environment where the electronic device is in a flipped state; wherein the operating environmental sensor comprises an angle sensor, the angle sensor being configured to detect a placement angle of the electronic device, the controller being configured to determine whether the electronic device is flipped based on the placement angle; the controller being configured to control the antenna selection switch to enable the first antenna as the working antenna, based on a determination that the electronic device is flipped, the controller being configured to control the antenna selection switch to enable an antenna with the highest signal intensity among the multiple antennas as the working antenna, based on a determination that the electronic device is not flipped.

11. The electronic device of claim 10, wherein the first antenna is an antenna located on the back of the electronic device among the multiple antennas.

12. The electronic device of claim 7, wherein the controller is further configured to analyze all antennas with a signal intensity greater than the preset value to obtain a second antenna with the smallest change in signal intensity within a preset time, and control the antenna selection switch to enable the second antenna as the working antenna.

* * * * *